(12) United States Patent
Romero et al.

(10) Patent No.: US 6,200,470 B1
(45) Date of Patent: *Mar. 13, 2001

(54) SUB-SOIL DOMESTIC WASTEWATER TREATMENT APPARATUS HAVING MULTIPLE AERATION CHAMBERS

(76) Inventors: Roland P. Romero, 1004 Hwy. 90 West, New Iberia, LA (US) 70562; Joseph L. Miller, 391 Gateway Dr., Moss Bluff, LA (US) 70611

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/111,313

(22) Filed: Jul. 7, 1998

(51) Int. Cl.[7] .......................... B01D 43/00; B01D 17/00; B01D 12/00
(52) U.S. Cl. ...................... 210/170; 210/220; 210/221.2; 210/247; 210/519; 210/521; 210/540; 210/532.2
(58) Field of Search ................................. 210/532.2, 170, 210/220, 221.2, 519, 521, 247, 540

(56) References Cited

U.S. PATENT DOCUMENTS

| | | | |
|---|---|---|---|
| 3,054,602 | * | 9/1962 | Proudman . |
| 3,741,393 | * | 6/1973 | Estes et al. .......................... 210/195 |
| 4,172,799 | * | 10/1979 | Perry et al. ......................... 210/170 |
| 5,061,369 | * | 10/1991 | Romero et al. ..................... 210/170 |
| 5,207,896 | * | 5/1993 | Graves . |
| 5,207,899 | * | 5/1993 | Boyle ................................. 210/138 |
| 5,468,375 | * | 11/1995 | Lira ..................................... 210/139 |
| 5,482,621 | * | 1/1996 | Nurse ................................. 210/170 |
| 5,569,376 | * | 10/1996 | Graves ............................. 210/195.4 |
| 5,620,602 | * | 4/1997 | Stuth ................................. 210/608 |

* cited by examiner

Primary Examiner—Chester T. Barry
(74) Attorney, Agent, or Firm—Greg R. Mier; Joseph L. Lemoine; Jesse D. Lambert

(57) ABSTRACT

A sub-soil wastewater treatment vessel, especially for wastewater produced by single family residences and small businesses and the like. The vessel is divided into at least three contiguous chambers by at least two transverse walls, forming at least two contiguous aeration chambers and a clarifier chamber. Wastewater flows into the first aeration chamber via an influent line, thence through an opening in the first transverse wall into the second aeration chamber. From there, wastewater flows through passages at the bottom of the second transverse wall into the clarifier chamber. Air is supplied to the first and second aeration chambers via low pressure diffuser lines. Three inclined surfaces within the clarifier chamber direct solids through passages in the second transverse wall back into the second aeration chamber for further processing. An effluent line connected to the clarifier chamber permits wastewater outflow.

17 Claims, 4 Drawing Sheets

SUB-SOIL DOMESTIC WASTEWATER TREATMENT APPARATUS HAVING MULTIPLE AERATION CHAMBERS

BACKGROUND

1. Field of the Invention

The subject invention relates generally to the treatment of wastewater and sewage with micro-organisms in the presence of oxygen typically supplied as air or some other source of oxygen, and relates more particularly to aerobically treating relatively small quantities of wastewater and sewage, such as that associated with single family homes, small apartment buildings, small office buildings and the like.

2. Description of Related Art

Ordinary domestic wastewater is comprised of solid materials such as human waste, food scraps, oils, soaps and chemicals. These solid materials must be adequately treated to eliminate health risks, disease control problems, and environmental damage.

The solid materials contained in domestic wastewater typically contain organic substances that are biodegradable under certain conditions, which explains why some wastewater treatment systems employ the process of biodegradation to improve the quality of domestic waste. Optimum biodegradation of domestic waste can be achieved through a process which typically includes the steps of finely dividing the solid materials suspended in the wastewater with some form of agitation, homogeneously mixing the finely divided materials with the liquid wastewater, and then aerating the mixture so as to promote the growth of aerobic bacteria which consumes the wastes. This series of biodegradation steps has been accomplished in small above ground systems and smaller below ground systems where the steps are typically combined into a single stage to minimize the size of the system.

One disadvantage with the small single stage system is that combining the steps of dividing, mixing, and aerating the domestic waste in a single stage prevents the aerobic bacteria from efficiently and effectively consuming the waste. The oxygen which is vital to aerobic activity only gets a single pass at the bacteria contained inside the system, which inevitably leads to inefficient and ineffective operation. The low efficiency and effectiveness usually results in an outflow that contains dissolved and suspended materials which are only partially decomposed. Decomposition then continues in the effluent line with the inherent acrid odors and clogging of downstream facilities.

Another disadvantage of the small single stage system is the absence of a "quiet zone," wherein suspended organic materials can settle from the effluent liquid and remain in the treatment system for a longer period of time in order to undergo further biodegradation. Agitation within the single stage system suspends the organic substances throughout the system, including the area near and around the discharge line, thereby inevitably causing some of the suspended solids to exit the system through the discharge line with the effluent liquid.

To overcome the problems associated with small single stage waste treatment systems, small stirrers have been added to improve the mixing within the system. However, the addition of stirrers require an increased amount of air to maintain biodegradation effectiveness and efficiency, and the pumps and stirring motors that are necessary to operate a stirrer generate noise and consume power. Furthermore, as with the single stage treatment systems, the effluent is often not fully treated by the time it reaches the discharge line, which can lead to offensive odors and clogging of downstream facilities. Still further, the absence of a "quiet zone" allows some of the suspended organic substances to exit the system before it is completely biodegraded.

Dual stage treatment systems have been introduced as an alternative solution to the problems inherent with single stage treatment systems. U.S. Pat. No. 5,061,369 to Romero, et al. discloses such a system. In Romero, the containerized domestic waste treatment system includes a liquid containing vessel divided into two chambers. Wastewater is fed into the first chamber where air is introduced to produce mixing and aerobic conditions. Once the wastewater is treated in the first chamber, it migrates into the second chamber where suspended solids are allowed to settle from the liquid before the treated wastewater exits the vessel. The dual stage treatment system is a marked improvement over single stage treatment systems. However, as in the single stage system, the oxygen used to maintain the activity level of the aerobic bacteria is limited to one pass through the system.

The apparatus of the present invention provides an energy efficient, low maintenance waste treatment system that thoroughly treats wastewater in multiple steps before the wastewater effluent is released to either the environment or to another downstream treatment facility. The present invention improves efficiency by producing turbulence and introducing oxygen in multiple stages in the waste treatment process, thereby reducing the amount of waste sludge and pollutants in the effluent stream, which in turn eliminates the offensive odors and clogging of downstream facilities.

SUMMARY OF THE INVENTION

The apparatus of the present invention is a domestic waste treatment vessel that is suitable for sub-soil installation. Internal deflection walls divide the internal compartment of the vessel into multiple adjacent chambers. The deflection walls have liquid flow passageways which connect the adjacent chambers. Each flow passageway has a substantial flow cross-sectional area so as to prevent clogging of the passageway by the occasional presence of solids which are resistant to biodegradation within the waste treatment system.

Domestic wastewater containing organic substances enters the vessel into the first of several chambers where it is agitated and aerated with air flowing through a first low-pressure diffuser bar which is disposed near the bottom of the first aeration chamber. The air flowing from the first low-pressure diffuser bar initiates the biodegradation process by producing turbulent mixing of the wastewater and creating a highly aerobic environment in the first aeration chamber.

As more domestic wastewater is received into the first aeration chamber, a portion of the biodegraded waste migrates from the first aeration chamber through the flow passageway disposed in the first deflection wall and enters into the second aeration chamber. The biodegradation process continues in the second aeration chamber, enhanced by air flowing through a second low-pressure diffuser bar disposed near the bottom of the second aeration chamber. The air flowing from the second low-pressure diffuser bar rejuvenates the aerobic bacteria thereby creating a second stage of highly aerobic activity to facilitate the continuation of the biodegradation of the organic substances in the second aeration chamber.

Additional aeration chambers may be employed after the second aeration chamber to further improve the efficiency and effectiveness of the waste treatment system in order to satisfy any particular environmental regulations or civic requirements. However, field tests have demonstrated that two aeration chambers are sufficient to comply with all current standards.

The biodegraded waste from the second (which may be the final) aeration chamber migrates through the flow passageways disposed in the final deflection wall and enters into the clarifier chamber where the homogeneous liquid, which contains finely divided solids, gradually migrates upward toward an effluent line located near the top of the clarifier chamber. During this migration, tranquil conditions within the clarifier chamber allow the solid particles to settle and return to the final aeration chamber for further biodegradation. The solids are directed back into the final aeration chamber by way of three inclined surfaces located at the bottom of the clarifier chamber. The circulating flow pattern of the agitated liquid in the final aeration chamber also helps to draw the settling solids from the clarifier chamber back into the final aeration chamber for further biodegradation.

The inlet to the effluent line may comprise discharge fittings through which the effluent must flow, which are designed to deflect solid particles back into the clarifier chamber before the wastewater is discharged from the waste treatment vessel. The deflected solid particles re-enter the tranquil conditions within the clarifier chamber before settling and returning to the final aeration chamber for further biodegradation.

The wastewater exiting the waste treatment system is virtually free of waste sludge, pollutants, and offensive odors, all of which can increase the risk of health problems, disease control problems, environmental damage, and clogging of downstream facilities.

Other advantages and aspects of the waste treatment system will become apparent to those skilled in the art upon reviewing the following detailed description, the drawings, and the appended claims.

DESCRIPTION OF THE PREFERRED EMBODIMENT

While the present invention will be described with reference to exemplary preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the present invention not be limited to the particular embodiments disclosed as the best mode contemplated for carrying out this invention, but that the invention will include all embodiments (and legal equivalents thereof falling within the scope of the appended claims.

Figure 1:
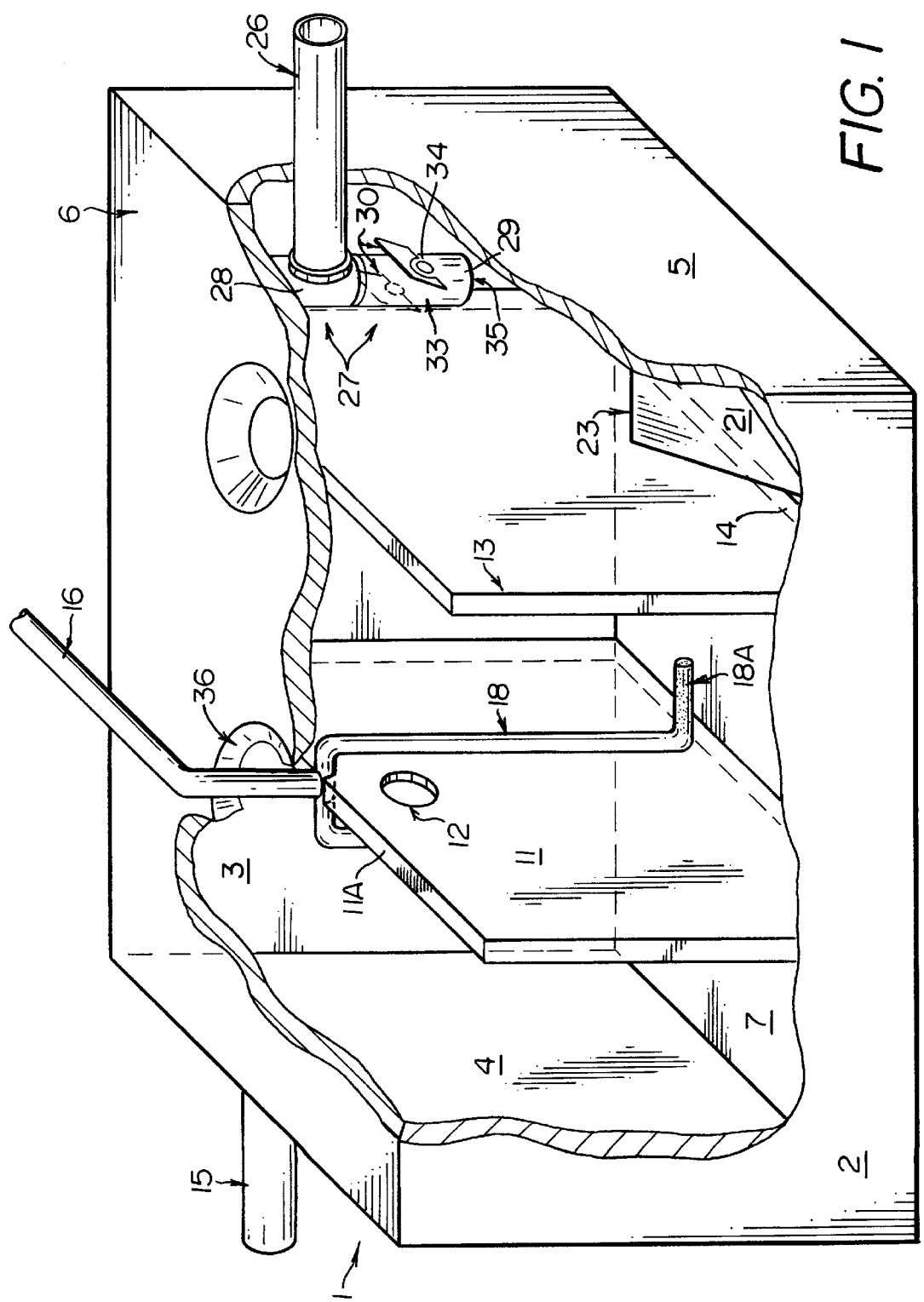
FIG. 1 is an isometric, pictorial, cutaway view of the preferred embodiment of the invention.

Referring to FIG. 1, the apparatus of the present invention includes a vessel 1 having first side wall 2 and second side wall 3, first end wall 4 and second end wall 5, a top 6, and a bottom 7. Preferably, side walls 2 and 3 are longer than end walls 4 and 5, thereby forming a vessel 1 which is rectangular when viewed from above, as shown in FIG. 3.

Figure 2:
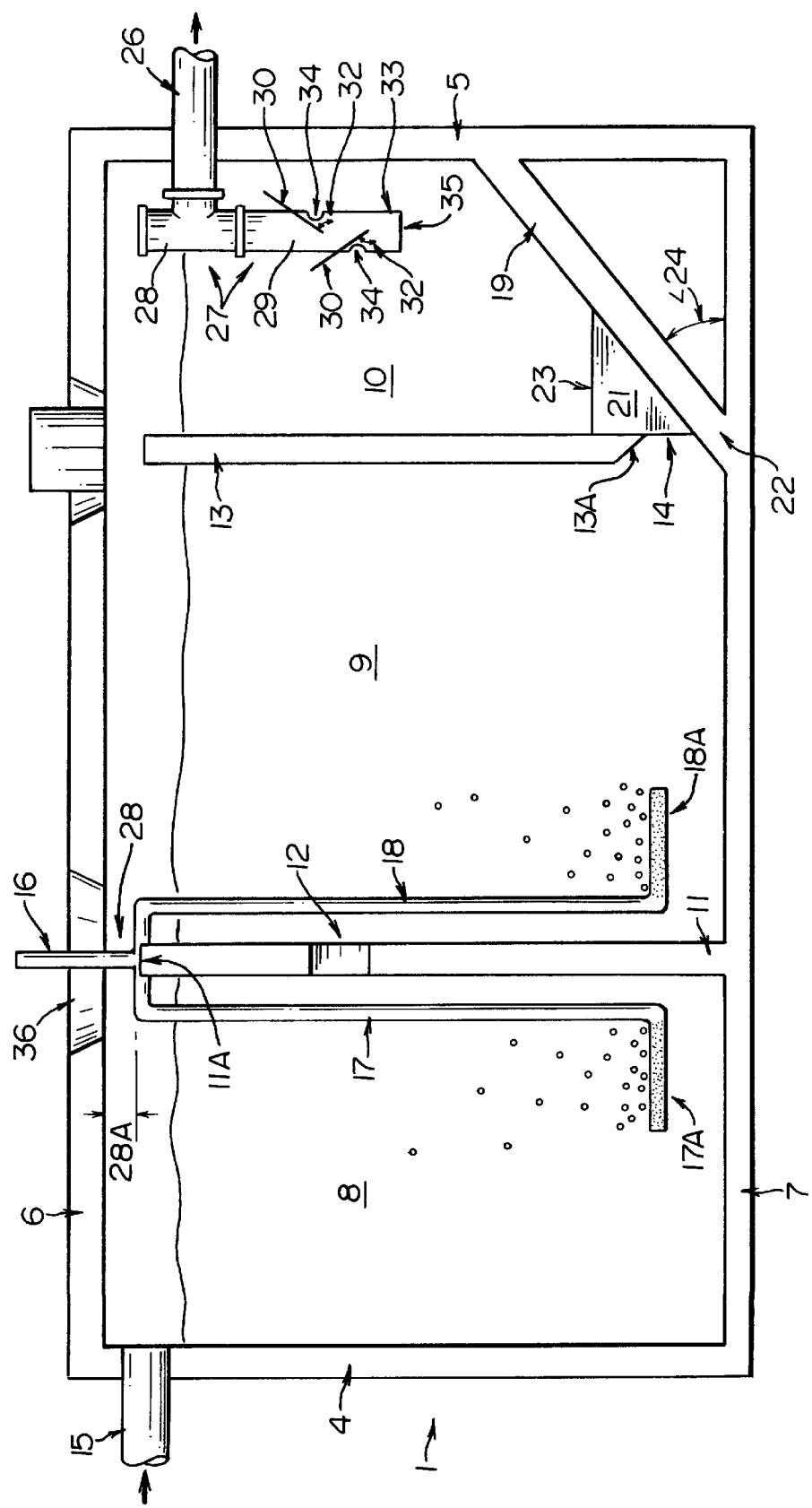
FIG. 2 is a side elevational cutaway view.
Figure 3:
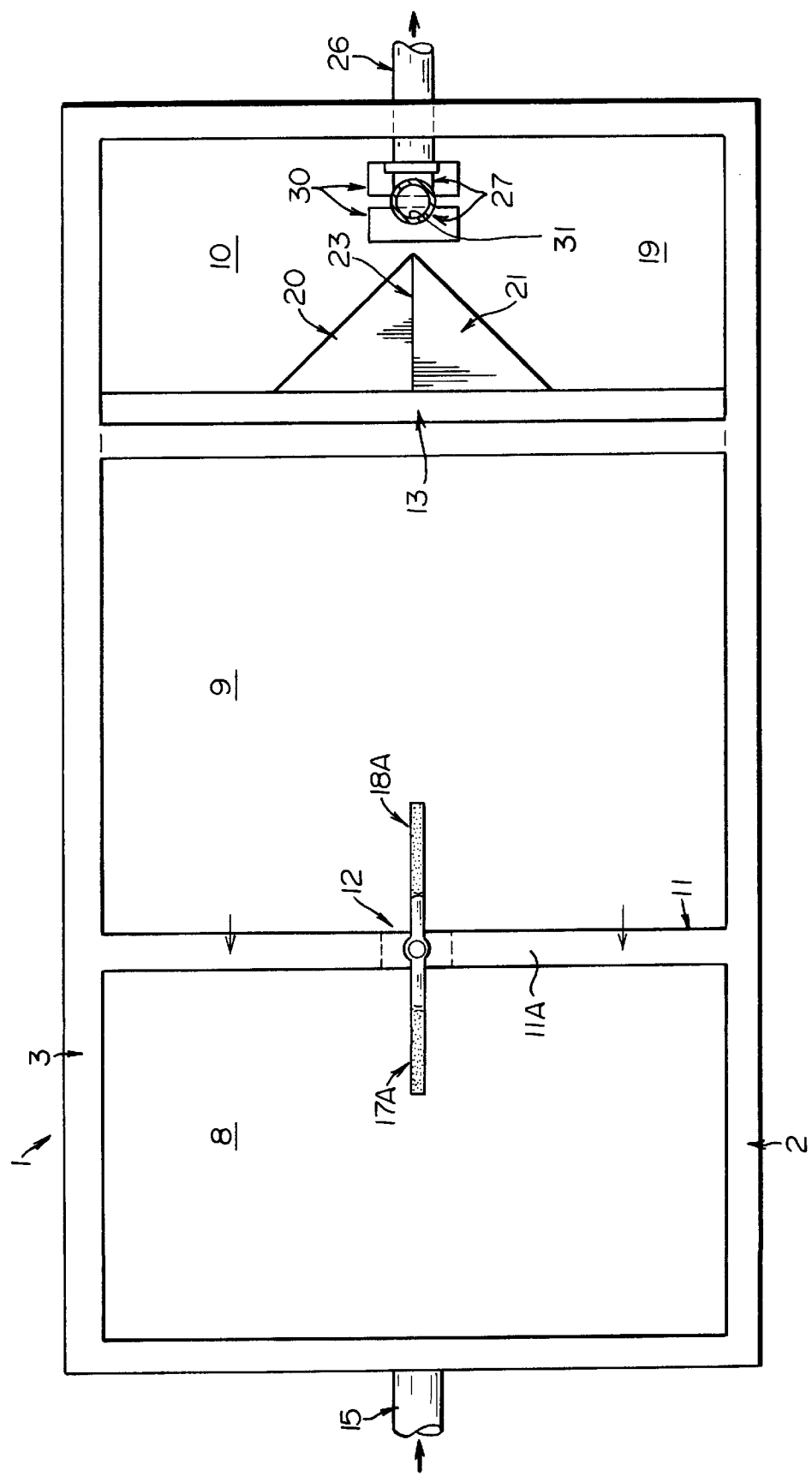
FIG. 3 is a top elevational cutaway view.
Figure 4:
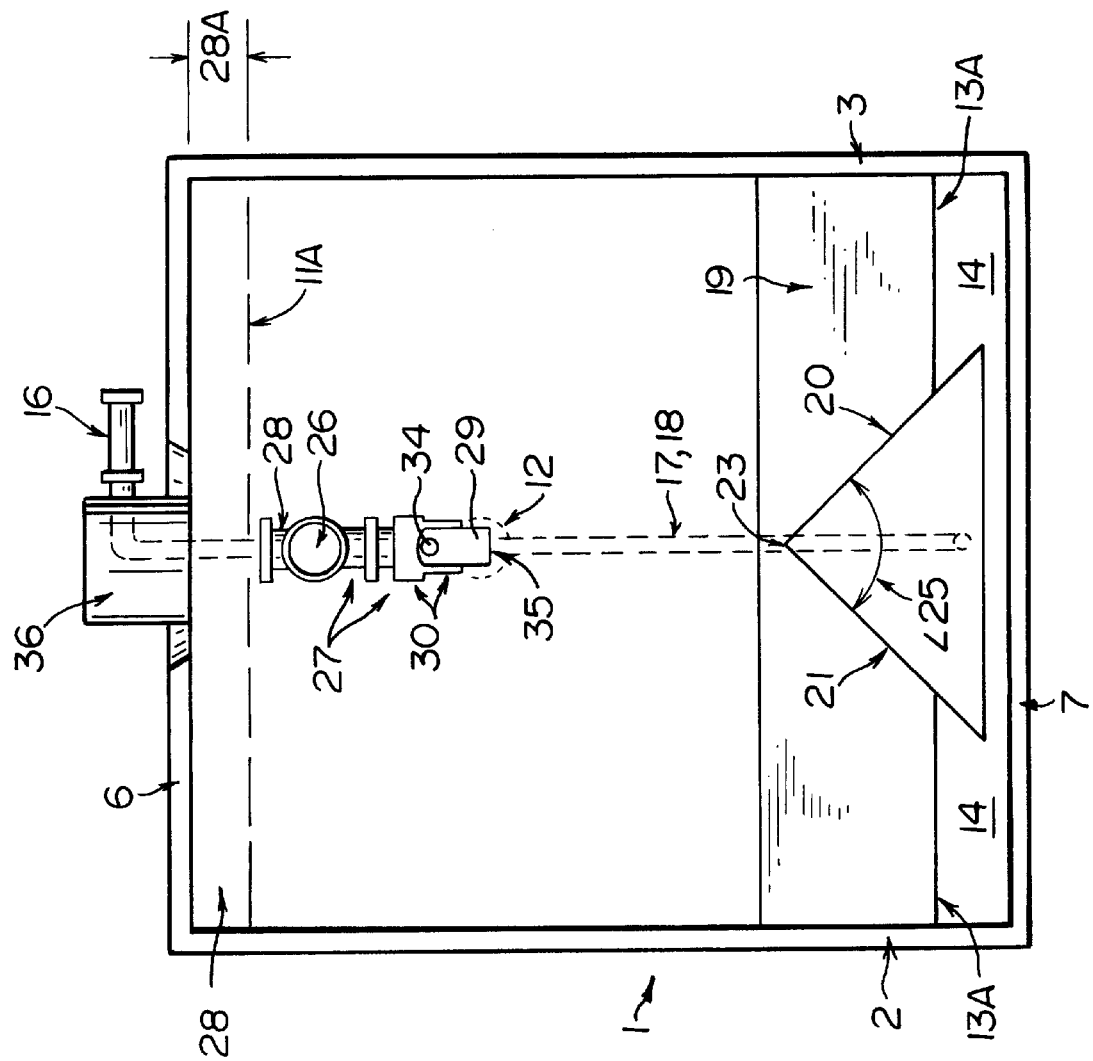
FIG. 4 is an end elevational cutaway view.

Referring now to FIGS. 2, 3, and 4, vessel 1 is preferably divided into three chambers—a first aeration chamber 8, a second aeration chamber 9, and a clarifier chamber 10—although an alternative embodiment can include additional aeration chambers and/or clarifier chambers when necessary to satisfy more stringent environmental requirements. When the preferred combination of two aeration chambers and one clarifier chamber is utilized, field tests have indicated that the optimum volumes of the respective chambers are approximately 300 gallons for first aeration chamber 8, 450 gallons for second aeration chamber 9, and 200 gallons for clarifier chamber 10.

In the preferred embodiment, a first deflection wall 11 is positioned between first aeration chamber 8 and second aeration chamber 9 so as to give first aeration chamber 8 a liquid holding capacity of approximately 300 gallons, thereby providing a wastewater retention time of approximately 18 hours when the wastewater is flowing at a rate of approximately 400 gallons per day. First deflection wall 11 is sealed across bottom 7 and along side walls 2 and 3 from bottom 7 up to a point substantially near top 6, creating an air space 28 between top edge 11A of first deflection wall 11 and top 6 of vessel 1. In the preferred embodiment, air space 28 has a height 28A of approximately 6 inches.

Vessel 1 and deflection walls 11 and 13 may be formed from a variety of materials. By way of example, reinforced concrete may be used, but other materials such as fiberglass, plastics, metal, and the like are all suitable.

Flow passageway 12 traverses first deflection wall 11 to allow flow of wastewater from first aeration chamber 8 to second aeration chamber 9. Flow passageway 12 preferably traverses first deflection wall 11 near top edge 11A of first deflection wall 11 to enhance agitation and circulation of the wastewater in first aeration chamber 8 and to prevent unbiodegradable solids from entering second aeration chamber 9, but flow passageway 12 can traverse first deflection wall 11 at any point along the first deflection wall 11, including at the bottom of first deflection wall 11. By way of example, flow passageway 12 may be centered approximately six inches below top edge 11A. Flow passageway 12 should have a flow area sufficiently large to avoid clogging by the occasional (but almost inevitable) introduction of biodegradation resistant solid material into vessel 1. Field tests have indicated that a circular opening having a diameter of approximately four inches provides the optimum flow area for flow passageway 12.

A second deflection wall 13 is positioned between second aeration chamber 9 and clarifier chamber 10 so as to give second aeration chamber 9 a liquid holding capacity of approximately 450 gallons and clarifier chamber 10 a liquid holding capacity of approximately 200 gallons, thereby providing a wastewater retention time of approximately 27 hours in second aeration chamber 9 and approximately 12 hours in clarifier chamber 10 when the wastewater is flowing at a rate of approximately 400 gallons per day. Second deflection wall 13 is sealed along side walls 2 and 3 down from a point at or substantially near top 6 to a point substantially near bottom 7, creating a bottom edge 13A on second deflection wall 13 and creating flow passageways 14 between bottom edge 13A and bottom 7 of vessel 1. In the preferred embodiment, wall 13 is sealed along top 6 except for a central opening, substantially shaped in the form of a half-circle of about three inches in diameter. Flow passageways 14 allow flow of wastewater from second aeration chamber 9 to clarifier chamber 10, and also allow solids settling in clarifier chamber 10 to return to second aeration chamber 9. Flow passageways 14 preferably have a flow area sufficiently large to avoid clogging by solid waste which is highly resistant to biodegradation, but sufficiently small to eliminate undesirable turbulence in clarifier chamber 10. In the preferred embodiment, flow passageways 14 comprise two lateral rectangular passages, each having a height of about 2½ inches.

An influent line 15 supplies domestic wastewater into first aeration chamber 8 near top 6 of vessel 1. Influent line 15 is preferably located near top 6 of vessel 1 to provide easier access to influent line 15 for maintenance and the like in case vessel 1 is installed underground.

In the preferred embodiment, a continuous flow of pressurized air from any convenient remote source is supplied to first aeration chamber 8 and second aeration chamber 9 through line 16 to produce air bubbles to agitate, circulate, and aerate the wastewater flowing through both aeration chambers 8 and 9. Line 16 enters vessel 1 through top 6 near top edge 11A of first deflection wall 11. After entering vessel 1, and in close proximity to top edge 11A, line 16 separates into first low-pressure diffuser line 17 and second low-pressure diffuser line 18.

First low-pressure diffuser line 17 extends downwardly into first aeration chamber 8 to a point preferably near bottom 7 of vessel 1, where a horizontal end section 17A of first low-pressure diffuser line 17 is horizontally disposed. Preferably, horizontal end section 17A comprises an air diffuser, such as an air stone, through which low pressure air is supplied thereby generating a large number of relatively small air bubbles. This increases the surface area of air in contact with the wastewater, and enhances aerobic activity.

The air flowing through horizontal end section 17A creates a circulating flow pattern inside first aeration chamber 8 so that suspended solids are swept up along first deflection wall 11 and past flow passageway 12 so as to minimize the amount of suspended solids that enter second aeration chamber 9 through flow passageway 12, and maximize the time that the suspended solids remain in first aeration chamber 8. It is desirable to keep the suspended solids in first aeration chamber 8 as long as possible to allow the aerobic bacteria to thoroughly biodegrade the suspended solids before they enter second aeration chamber 9.

Second low-pressure diffuser line 18 extends downwardly into second aeration chamber 9 to a point preferably near bottom 7 of vessel 1, where a horizontal end section 18A is horizontally disposed. As with horizontal end section 17A, horizontal end section 18A preferably comprises an air diffuser (such as an air stone) through which low pressure air is supplied, thereby generating a large number of relatively small air bubbles which serve to create a second stage of optimum agitation, circulation, and aeration within second aeration chamber 9.

The second stage of agitation and circulation inside second aeration chamber 9 further breaks down the organic substances contained in the wastewater and continues the biodegradation of those organic substances that have been previously subjected to the biodegradation process in first aeration chamber 8. The air flowing through horizontal end section 18A creates a circulating flow pattern inside second aeration chamber 9 so that suspended solids are swept up along first deflection wall 11, down second deflection wall 13, and past flow passageways 14 so as to draw suspended solids that have settled in clarifier chamber 10 back into second aeration chamber 9 to subject those suspended solids to further agitation, circulation, and aeration within second aeration chamber 9. Again, it is desirable to maintain the suspended solids in second aeration chamber 9 as long as possible to allow the aerobic bacteria to thoroughly biodegrade the suspended solids before they enter or reenter clarifier chamber 10. Although various volumetric flow rates are possible, tests have shown that 1.5 to 2.0 cubic feet of air per minute are satisfactory.

Positioned near bottom 7 of vessel 1 in clarifier chamber 10 are first inclined wall 19, second inclined wall 20, and third inclined wall 21. These walls direct solids that are settling in clarifier chamber 10 back into second aeration chamber 9 through flow passageways 14 to undergo further biodegradation in second aeration chamber 9. First inclined wall 19 extends transversely between side walls 2 and 3 and has a lower edge 22 which intersects bottom 7 of vessel 1 in close proximity to second deflection wall 13. Lower edge 22 preferably intersects with bottom 7 of vessel 1 at such a position that a portion of first inclined wall 19 extends into aeration chamber 9. From lower edge 22, first inclined wall 19 is sloped upwardly at an angle 24 until it intersects with end wall 5. Angle 24 should be sufficiently sloped to prevent settling solids from accumulating in clarifier chamber 10 and also to ensure that the settling solids are directed back into aeration chamber 9 where they will be swept up by the circulating flow within aeration chamber 9 and subjected to further biodegradation. Angle 24 is approximately 60 degrees from horizontal, although angles between 45 and 65 degrees are satisfactory.

Second inclined wall 20 and third inclined wall 21 extend longitudinally between second deflection wall 13 and first inclined wall 19, where they form a wedge shaped structure which slopes from a centrally high point 23 down toward first inclined wall 19 and out toward side walls 2 and 3. Second inclined wall 20 and third inclined wall 21 are connected edge-to-edge at high point 23 and slope away from each other at an angle 25. Similar to angle 24, angle 25 should be sufficiently sloped to prevent settling solids from accumulating in clarifier chamber 10 and to ensure that the settling solids are directed back into aeration chamber 9 for further biodegradation. Angle 25 may be 60 degrees, resulting in second and third inclined walls 20 and 21 being at 60 degrees from horizontal. However, angle 25 may be between 90 degrees and 50 degrees, resulting in second and third inclined walls 20 and 21 being between 45 and 65 degrees from horizontal.

Effluent line 26 provides a means for the biodegraded wastewater to exit clarifier chamber 10. Effluent line 26 is preferably disposed near top 6 of vessel 1 to maximize the amount of solids settling from the wastewater in clarifier chamber 10 and, therefore, minimize the amount of solids entering effluent line 26. In one embodiment, effluent line 26 is placed at an elevation below an elevation of influent line 15. A suitable arrangement is effluent line 26 positioned 8 to 12 inches below the top 6 of vessel 1, and 1 to 3 inches below an elevation of influent line 15.

As shown in FIG. 2, discharge fittings 27 are connected to effluent line 26 and preferably include a pipe tee 28 and a weir-tee flow divider 29. Pipe tee 28 is connected directly to effluent line 26 and is designed to provide easy access to discharge fittings 27 or effluent line 26 in case either becomes clogged with non-biodegradable material.

Weir-tee flow divider 29 extends downwardly from pipe tee 28 and includes a plurality of diverters 30. Each diverter 30 is preferably a thin, rectangular plate which is sealably disposed through a portion of outer surface 33 of weir-tee flow divider 29 so that cross-sectional area 31 of weir-tee flow divider 29 is partially blocked. Each diverter 30 is preferably positioned at an angle 32 (which may be on the order of 45 degrees from horizontal) which slopes upwardly from within weir-tee flow divider 29 to outer surface 33 of weir-tee flow divider 29. An opening 34 is placed immediately below the highest point of intersection between weir-tee flow divider 29 and outer surface 33. As suspended solids enter discharge fittings 27 through bottom 35 of weir-tee flow divider 29, diverters 30 impede the solids from continuing up through weir-tee flow divider 29 and direct the solids through openings 34 back into clarifier chamber 10, thereby minimizing the amount of suspended solids entering effluent line 26.

During typical operation of the apparatus of the present invention, domestic wastewater is introduced into first aeration chamber 8 of vessel 1 through influent line 15. Inside first aeration chamber 8, the wastewater is circulated, agitated and aerated by means of tiny air bubbles flowing from horizontal end section 17A of first low pressure diffuser line 17. The tiny air bubbles provide oxygen to the aerobic bacteria contained inside first aeration chamber 8 to enable the aerobic bacteria to actively biodegrade the organic matter in the wastewater.

As more domestic wastewater is fed into first aeration chamber 8, a portion of the wastewater contained in first aeration chamber 8 flows through flow passageway 12 into second aeration chamber 9. However, the circular flow pattern within first aeration chamber 8 created by the air bubbles flowing from horizontal end section 17A of first low pressure diffuser line 17 helps to minimize the amount of suspended solids entering into second aeration chamber 9 by sweeping the suspended solids past flow passageway 12. This sweeping action maximizes the time period during which the suspended solids remain within first aeration chamber 8 for optimum biodegradation.

The wastewater and suspended solids that do manage to enter second aeration chamber 9 through flow passageway 12 are circulated, agitated and aerated by means of tiny air bubbles flowing from horizontal end section 18A of second low pressure diffuser line 18. As in first aeration chamber 8, the tiny air bubbles provide oxygen to the aerobic bacteria contained inside second aeration chamber 9 to enable the aerobic bacteria to continue the biodegradation process initiated in first aeration chamber 8.

Any excess and unused air flowing from first aeration chamber 8 and second aeration chamber 9 exits vessel 1 either through influent line 15, which is rarely liquid full, or through first manway 36, which is located on top 6 of vessel 1.

After being circulated, agitated and aerated in second aeration chamber 9, a portion of the treated wastewater, which is a homogenous mixture of liquid and finely divided solids, flows from second aeration chamber 9 through flow passageways 14 into clarifier chamber 10. As the homogenous mixture gradually migrates up through clarifier chamber 10, tranquil conditions within clarifier chamber 10 promote settlement of the finely divided solids onto inclined walls 19, 20, and 21. Inclined walls 19, 20, and 21 direct the settled solids back into second aeration chamber 9 through flow passageways 14 for further circulation, agitation and aeration. The circular flow pattern within second aeration chamber 9 also helps to sweep the settled solids from inclined surfaces 19, 20 and 21 and into second aeration chamber 9.

The biodegraded wastewater exits clarifier chamber 10 near top 6 of vessel 1 through discharge fittings 27 and effluent line 26. Any suspended solids entering discharge fittings 27 through bottom 35 of weir-tee flow divider 29 are discouraged from entering effluent line 26 by diverters 30, which direct the suspended solids through openings 34 back into clarifier chamber 10. The remaining wastewater continues through discharge fittings 27 and ultimately exits vessel 1 through effluent line 26.

The foregoing description is illustrative and exemplary of the invention and various changes may be made without departing from the scope and spirit of the invention.

We claim:

1. A wastewater treatment apparatus, suitable for sub soil installation, comprising:

(a) a liquid sealed vessel having a substantially horizontal floor, a substantially vertical first end wall, a substantially vertical second end wall, substantially vertical left and right sidewalls, and a substantially horizontal top;

(b) a first deflection wall having a flow passageway therethrough and a top, the first deflection wall being positioned within the vessel, where the first deflection wall sealingly extends along said floor of said vessel and upwardly along said left and right side walls of said vessel to a point at which the top of said first deflection wall is in close proximity to the top of said vessel;

(c) a first aeration chamber within said vessel between said first end wall and said first deflection wall;

(d) a second deflection wall having a top and a bottom, the second deflection wall being positioned within said vessel between said first deflection wall and said second end wall, where said second deflection wall sealingly extends along said left and right side walls of said vessel to a point at which the top of said second deflection wall is in close proximity to the top of said vessel, creating an air passage between the top of said second deflection wall and the top of said vessel, and the bottom of said second deflection wall is in close proximity to the floor of said vessel, creating a flow passageway between the bottom of said second deflection wall and the floor of said vessel;

(e) a second aeration chamber within said vessel between said first deflection wall and said second deflection wall;

(f) a clarifier chamber within said vessel between said second deflection wall and said second end wall;

(g) an influent line extending into said vessel through an upper part of said first end wall;

(h) an effluent line extending into said vessel through an upper part of said second end wall;

(i) a pipe tee connected to said effluent line within said vessel;

(j) a weir-tee flow divider extending downwardly from said pipe tee, the weir-tee flow divider comprising an open bottom, an outer surface, and a cross-sectional area the weir-tee flow divider further comprising a plurality of thin plates sealably disposed through a portion of said outer surface so as to block a portion of said cross-sectional area, the thin plates positioned at a downward angle through said outer surface, the weir-tee flow divider further comprising openings through said outer surface adjacently below each of said plurality of thin plates, where said openings provide return passages into the clarifier chamber so that substantially all of the suspended solids entering said weir-tee flow divider are directed through said openings and returned to the clarifier chamber and second aeration chamber for further biodegradation;

(k) an air supply line having a first outlet disposed in said first aeration chamber and a second outlet disposed in said second aeration chamber, said air supply line supplied with pressurized air from a remote source;

(l) a first generally planar inclined surface for directing settling solids in said clarifier chamber back through said flow passageways in said second deflection wall, the first inclined surface extending transversely to the left and right side walls of said vessel, and having
  (1) a lower portion which intersects said floor of said vessel within said second aeration chamber, and
  (2) an upper portion which intersects said second end wall, whereby the settling solids in said clarifier chamber are directed back into said aeration chamber wherein the settling solids are subjected to further biodegradation;

(m) a second and third generally planar inclined surfaces forming a centrally positioned wedge shaped structure extending longitudinally between said second deflection wall and said first inclined surface, said second and third inclined surfaces having a lower portion which intersects the floor of said vessel at a line contiguous with the interiorly disposed edges of the flow passages in said second deflection wall.

2. The apparatus of claim 1, wherein said first aeration chamber has a volumetric capacity between 250 and 350 gallons, said second aeration chamber has a volumetric capacity between 400 and 500 gallons, and said clarifier chamber has a volumetric capacity between 150 and 250 gallons.

3. The apparatus of claim 2, wherein said air supply line divides into a first low-pressure diffuser line and a second low-pressure diffuser line, the first low-pressure diffuser line being disposed within said first aeration chamber in close proximity to said first deflection wall and having a substantially horizontal section disposed near said floor of said vessel, the second low-ressure diffuser line being disposed within said second aeration chamber in close proximity to said first deflection wall and having a substantially horizontal section disposed near said floor of said vessel, and wherein said horizontal sections of said first and second low-pressure diffuser lines are air diffusers.

4. The apparatus of claim 3, wherein said inclined surfaces each form an angle between about 45° and 65° from horizontal.

5. The apparatus of claim 1, wherein said influent line extends through said first end wall of said vessel at an elevation above an elevation of where said effluent line extends through said second end wall.

6. The apparatus of claim 5, wherein said effluent line extends through said second end wall of said vessel at an elevation 8 to 12 inches below the top of said vessel and 1 to 3 inches below said elevation of said influent line.

7. The apparatus of claim 1, wherein said flow passageway through said first deflection wall is in close proximity to the top of said first deflection wall and said flow passageway is a substantially horizontal tubular section having an inner diameter between about three inches and six inches.

8. The apparatus of claim 7, wherein said inclined surfaces each form an angle between about 45° and 65° from horizontal.

9. The apparatus of claim 4, wherein said floor, first end wall, second end wall, left and right sidewalls, top, first deflection wall, second deflection wall, and first, second, and third planar inclined surfaces are constructed of reinforced concrete.

10. The apparatus of claim 4, wherein said floor, first end wall, second end wall, left and right sidewalls, top, first deflection wall, second deflection wall, and first, second, and third planar inclined surfaces are constructed of metal.

11. The apparatus of claim 4, wherein said floor, first end wall, second end wall, left and right sidewalls, top, first deflection wall, second deflection wall, and first, second, and third planar inclined surfaces are constructed of fiberglass.

12. The apparatus of claim 6, wherein said floor, first end wall, second end wall, left and right sidewalls, top, first deflection wall, second deflection wall, and first, second, and third planar inclined surfaces are constructed of reinforced concrete.

13. The apparatus of claim 6, wherein said floor, first end wall, second end wall, left and right sidewalls, top, first deflection wall, second deflection wall, and first, second, and third planar inclined surfaces are constructed of metal.

14. The apparatus of claim 6, wherein said floor, first end wall, second end wall, left and right sidewalls, top, first deflection wall, second deflection wall, and first, second, and third planar inclined surfaces are constructed of fiberglass.

15. The apparatus of claim 8, wherein said floor, first end wall, second end wall, left and right sidewalls, top, first deflection wall, second deflection wall, and first, second, and third planar inclined surfaces are constructed of reinforced concrete.

16. The apparatus of claim 8, wherein said floor, first end wall, second end wall, left and right sidewalls, top, first deflection wall, second deflection wall, and first, second, and third planar inclined surfaces are constructed of metal.

17. The apparatus of claim 8, wherein said floor, first end wall, second end wall, left and right sidewalls, top, first deflection wall, second deflection wall, and first, second, and third planar inclined surfaces are constructed of fiberglass.

* * * * *